United States Patent
Raponi

(10) Patent No.: US 7,473,311 B2
(45) Date of Patent: Jan. 6, 2009

(54) CEMENTITIOUS COMPOSITION

(75) Inventor: Dante A. Raponi, Panama City, FL (US)

(73) Assignee: Summa-Magna 1 Corporation, Panama City, FL (US)

( * ) Notice: Subject to any disclaimer, the term of this patent is extended or adjusted under 35 U.S.C. 154(b) by 0 days.

(21) Appl. No.: 11/802,180

(22) Filed: May 21, 2007

(65) Prior Publication Data

US 2008/0289276 A1   Nov. 27, 2008

(51) Int. Cl.
*C04B 7/00* (2006.01)
*C04B 7/02* (2006.01)
*C04B 7/32* (2006.01)

(52) U.S. Cl. .................... 106/606; 106/654; 106/664; 106/695

(58) Field of Classification Search .................. 106/90, 106/99; 260/29.65, 42.13; 52/659
See application file for complete search history.

(56) References Cited

U.S. PATENT DOCUMENTS

| | | | |
|---|---|---|---|
| 3,044,547 A | 6/1962 | Jarboe | |
| 4,019,919 A | 4/1977 | DeSalvo | |
| 4,058,406 A * | 11/1977 | Raponi | 524/8 |
| 4,183,759 A * | 1/1980 | Epstein | 106/38.2 |
| 4,752,538 A | 6/1988 | Bounini | |
| 4,842,650 A * | 6/1989 | Blounts | 524/5 |
| 5,221,702 A | 6/1993 | Richards | |
| 5,298,071 A * | 3/1994 | Vondran | 106/757 |
| 5,422,051 A * | 6/1995 | Sawyers | 264/31 |
| 5,601,643 A | 2/1997 | Silverstrim et al. | |
| 5,725,652 A | 3/1998 | Shulman | |
| 5,779,787 A | 7/1998 | Brothers et al. | |
| 6,030,446 A | 2/2000 | Doty et al. | |
| 6,030,572 A * | 2/2000 | Berto | 264/446 |
| 6,464,775 B2 * | 10/2002 | Crook | 106/731 |
| 6,471,767 B1 * | 10/2002 | Konczak | 106/739 |
| 6,645,288 B1 | 11/2003 | Dargaud et al. | |
| 6,753,081 B1 * | 6/2004 | Lovett et al. | 428/373 |
| 6,824,607 B2 | 11/2004 | Baeuml et al. | |
| 6,902,001 B2 | 6/2005 | Dargaud et al. | |
| 6,907,708 B2 | 6/2005 | Naji et al. | |
| 6,969,423 B2 | 11/2005 | Li et al. | |
| 6,972,144 B2 | 12/2005 | Roth et al. | |
| 7,052,542 B2 * | 5/2006 | Ding | 106/636 |
| 7,168,232 B2 * | 1/2007 | Lovett et al. | 57/243 |
| 2002/0129745 A1 * | 9/2002 | Semmens | 106/802 |
| 2003/0041782 A1 | 3/2003 | Malloy et al. | |
| 2003/0084822 A1 | 5/2003 | Barrow | |
| 2003/0159391 A1 | 8/2003 | Naji et al. | |
| 2004/0007360 A1 * | 1/2004 | Leroy-Delage et al. | 166/293 |
| 2004/0079259 A1 | 4/2004 | Manig | |
| 2004/0089204 A1 | 5/2004 | Baeuml et al. | |
| 2004/0251026 A1 | 12/2004 | Dargaud et al. | |
| 2005/0066857 A1 | 3/2005 | Li et al. | |

FOREIGN PATENT DOCUMENTS

JP   2004323312   11/2004

* cited by examiner

*Primary Examiner*—Richard E Chilcot, Jr.
*Assistant Examiner*—Mark R Wendell
(74) *Attorney, Agent, or Firm*—Birch, Stewart, Kolasch & Birch, LLP

(57) ABSTRACT

The invention is an improved cementitious mixture used to form structural components that are strong, lightweight, heat and fire resistant, and very economical to produce. The material includes a mixture of cement, water, ribbon-like virgin polyethylene strips and aggregate materials. The aggregate preferably includes recycled industrial waste products. Examples of these industrial wastes include shredded tires, wood by-products, waste coal combustion by-products, recycled waste gypsum products, recycled industrial foundry sand, and waste foam products such a Styrofoam. This new cementitious material is strong and lightweight. It has a lower thermal conductivity than conventional concrete and therefore improved insulative properties. The use of industrial recyclables not only enhances the performance characteristics of the components made from this material but aids in maintaining the environment by providing a practical use for industrial waste.

14 Claims, 1 Drawing Sheet

CEMENTITIOUS COMPOSITION

BACKGROUND OF THE INVENTION

1. Field of the Invention

The invention relates to a cementitious composition that can be used in a variety of applications including the molding of structural components. The material can be used in virtually any application where strong, lightweight, cement-like material is needed. The composition is a settable mixture that includes hydraulic cement, polyethylene strips, and significant amounts of aggregate recyclables that may include shredded tires, wood by-products, gypsum by-products, coal combustion by-products, foundry waste sand, waste foam materials or other similar waste materials. The resulting material is strong, lightweight, fire-resistant, heat resistant, environmentally safe, and very economical to produce.

2. Description of the Related Art

Applicant's previous patent, U.S. Pat. No. 4,058,406, describes a composition that includes a mixture of hydraulic cement, aggregate, water and waste polyethylene coated fiberboard strips. While this composition is sufficient for some applications, there exists a need for new environmentally friendly cementitious compositions that incorporate industrial waste to help solve today's growing waste management problems as well as provide safe, clean, low cost, high performance materials needed by society. The invention contemplates the use of industrial recyclable materials in combination with cement mixtures and virgin polyethylene strips to achieve an improved product that has high performance characteristics, is twice as strong as the prior product, is economically produced, and environmentally friendly.

BRIEF SUMMARY OF THE INVENTION

The invention relates to a cementitious composition that includes the use of ribbon-like virgin polyethylene strips and industrial waste recyclables. The use of polyethylene strips in the composition results in added strength and weight reduction among other desirable characteristics and the use of industrial recyclables improves the performance characteristics of the composition and helps to preserve the environment. The invention also includes the structural components made using these compositions as well as the method of making these components.

The use of ribbon-like strips of virgin polyethylene as an additive has been found to be advantageous. In contrast to the applicant's previous patent mentioned above, it has been found that it is desirable to use virgin polyethylene strips, as opposed to the strips of the prior patent which were waste strips that included cellulose fiber material coated with polyethylene material. The virgin strips can be of varying width, length, and thickness depending on the desired size and use of the structural component being molded. The use of virgin ribbon-like polyethylene strips adds strength and structural integrity to the final product. The strips are randomly distributed within the cementitious mixture and result in a superior bond or interaction with the cementitious mixture and therefore produce an improved product of high structural performance.

Another important aspect of the invention is the use of industrial waste materials in the cementitious mixture. The disposal of industrial waste has become a worldwide problem. The disposal of used vehicle tires is particularly troublesome. Used tires cannot be placed in landfills, as they will surface. Also, tires that are piled become breeding grounds for mosquitoes after rains, causing environmental and health problems. Burning tire dumps cause catastrophic environmental hazards. In this invention the used tires do not pose the aforementioned problems since they are shredded and used as aggregate in a fixed position within the matrix of the composition.

Typically the used tires are shredded into pieces, rinsed, and added to the cementitious mixture. I have found that it is advantageous and economical to shred the entire tires without removing any of the components such as the casings or belts. The shredded pieces can be of varying size depending on the use and size of the component being molded.

Other waste materials that can be used as aggregate in the cementitious mixture are wood chips, or wood pieces, gypsum waste products, coal combustion by-products, industrial foundry waste sand, and waste foam products such as Styrofoam. Stone, gravel, and/or sand may also be used as an aggregate material in various amounts. All of these aggregate materials may be used individually or in various combinations.

Further advantageous additives to the cementitious mixture are residuals derived from the manufacture and production of the titanium dioxides. Titanium dioxide is a product made from the minerals rutile or ilmenite. Titanium dioxide reacts with ultraviolet light to decompose pollutants such as smog-forming nitrogen oxides. Thus cementitious material containing titanium dioxide residuals has the ability to help clean the air by dissolving pollutants.

Another aspect of this invention is the use of the improved cementitious material in constructing buildings and similar structures that are extremely resistant to wind and water forces. Building components made from the improved cementitious material are assembled using steel reinforcing. Since the improved cementitious material shows considerable ductility, comparable steel of high ductility is used in the design and manufacture of the reinforced structures. Structures reinforced using this method are highly resistant to the combined stresses of tornados, hurricanes, and other storms or impacts due to atmospheric conditions thereby minimizing destruction of such structures.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
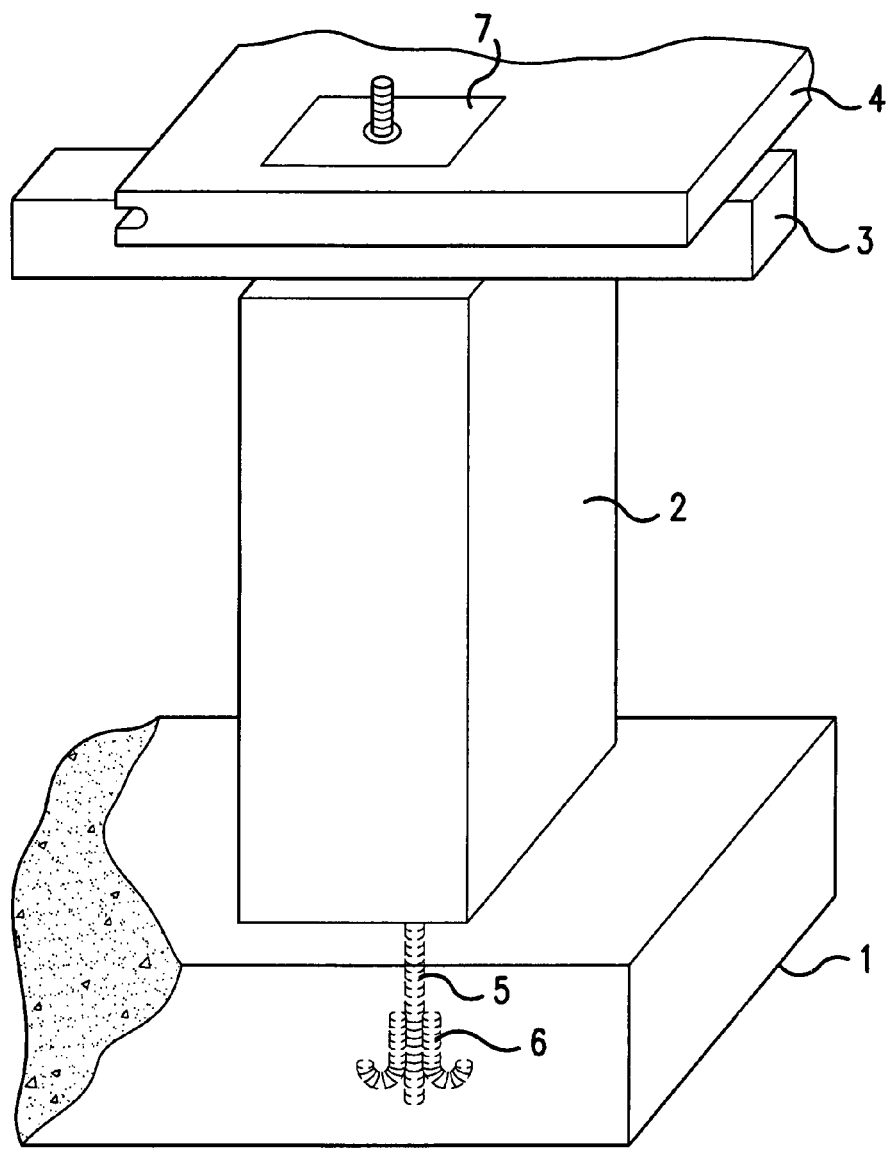
FIG. 1 illustrates a steel reinforced assembly of building components that results in a structure that is highly resistant to destructive forces.

The cementitious mixture typically comprises 10-35% by weight hydraulic cement, 24-40% by weight water, 0.04-0.1% by weight virgin polyethylene strips, and 40-65% by weight aggregate. Other additives such as residuals from the manufacture and production of titanium dioxides, coloring agents, water reducing and air entraining agents, and decorative components may also be added.

The virgin polyethylene strips are typically cut into ribbon-like pieces and added to the mixture. The strips add structural integrity to the resulting material in that they randomly mix and are dispersed in the liquid cementitious material before it sets and thus add strength to the final product. Tests have shown that the use of virgin strips produce superior strength and integrity over the waste strips used in the inventor's previous patent. Virgin strips are strips that consist essentially of polyethylene and do not contain any substantial amount of non-polyethylene material. The previously used strips, in applicant's prior patent, were cut from waste products that included polyethylene coated fibrous cellulose material, typically coated container material. Therefore the strips contained a substantial amount of cellulose material. The virgin polyethylene strips of the present invention are devoid of any such cellulose material and therefore result in a much stronger and more structurally sound final product that is superior to the previous products made. The polyethylene strips may be cut from polyethylene sheet material that has a thickness of less than 1 mil to several mils thick. High, medium, or low-density polyethylene may be used. The strips may be of uniform width or varying widths and of uniform length or varying lengths. The use of ribbon-like strips of polyethylene as opposed to other shapes of polyethylene results in a superior final product that accepts and holds fasteners such as nails, screws, and the like very well. The random overlapping of the strips acts to strengthen and mechanically bond the cementitious material. Typically the length of the ribbon-like strips is 5 to 40 times the width.

Compression tests were performed on structural units incorporating virgin polyethylene strips. The two specimens tested withstood compression loads of up to 709,776 lbs./sq.ft., roughly twice the compressive strength of the prior art components that used strips of waste polyethylene coated fibrous cellulose material.

Typically aggregates such as various combinations of gravel, stone, and/or sand are used in cementitious mixtures. These aggregates are considered expensive and therefore it is desirable to use waste products to supplement or replace these types of aggregates to lower costs, improve structural properties and help the environment.

The use of shredded tires as an aggregate serves both the benefit of reducing the environmental impact of disposing of used tires and adding strength and weight reduction to the final product. Whole tires are shredded without the need to separate different parts of the tires. Metal belts and strands within the tires can be shredded along with the tire material and used as the aggregate. The shredded tires are rinsed before being added to the cementitious mixture to eliminate contaminants. The size of the pieces of shredded tires can vary from small crumb size pieces to pieces that are golf ball or baseball size depending on the product being formed. The pieces in any given product can be of a uniform size or variable in size.

Other types of waste aggregates include wood waste products such as wood chips, lumber, and other wood pieces. Typically the wood is chipped or shredded into sizes compatible with the desired final product. The wood pieces can be sized within the same ranges as the shredded tires. Coal combustion waste products are also a suitable aggregate material. Fly ash and bottom ash are examples of such waste products that can be added to the cementitious mixture. These waste products act as a water reducing agent and cause the final material to be highly resistant to attacks of sulphate. Therefore the cementitious material containing coal combustion waste products is well suited for structures such as seawalls, bulkheads, artificial reefs, piers, bridges, riprap, and many other applications.

Other possible aggregates include gypsum products such as waste phosphogypsom (gyp). Also waste products such as Styrofoam and similar foam products may be used. Again these products can be shredded, cut, or broken into pieces for inclusion in the mixture.

In some situations it may be desirable to add residuals derived from the manufacture and production of titanium dioxides to the mixture. Titanium dioxide residuals, when added to a cementitious material, may react with ultraviolet light to decompose pollutants such as smog forming nitrogen oxides. Thus building components made from the cementitious composition containing the titanium dioxide residuals act to clean the air and provide a healthier environment.

The mixture is typically formed by mixing the dry components of the mixture and adding the water component while mixing. Portable cement mixers and large mixing facilities can be used to create the cementitious slurry and then the slurry is typically poured into molds or forms. In certain applications the wet slurry can be spread or smoothed to fill a form. Molds can be vibrated to eliminate voids in the final product. Small batches may be mixed by hand.

One method of casting components from the composition described above is sand casting. This process is very low cost and especially useful for riprap components used to construct underwater structures, reefs, bulkheads, erosion protection, and the like. In this process, holes are dug in sand or sandy soil and the cementitious mixture in the liquid state is poured into the holes. After the mixture hardens the components are removed and used.

The following examples of cementitious material compositions are illustrative of the compositions and products that may be produced using this invention. All compositions are expressed as parts by weight.

EXAMPLE 1

| | |
|---|---|
| Virgin polyethylene strips | 13.0 parts |
| Fly Ash | 70.0 parts |
| Bottom Ash | 60.0 parts |
| Woodchips | 35.0 parts |
| Cement | 27.5 parts |
| Water | 100.0 parts |

EXAMPLE 2

| | |
|---|---|
| Virgin polyethylene strips | 13.0 parts |
| Cement | 30.0 parts |
| Recycled shredded tires | 63.5 parts |
| Fly Ash | 40.0 parts |
| Bottom Ash | 55.0 parts |
| Water | 113.5 parts |

EXAMPLE 3

| | |
|---|---|
| Virgin polyethylene strips | 13.0 parts |
| Bottom Ash | 120.0 parts |
| Fly Ash | 70.0 parts |
| Styrofoam Recyclables | 70.0 parts |

-continued

| | |
|---|---|
| Sand | 20.0 parts |
| Cement | 30.0 parts |
| Water | 113.5 parts |

Materials made from the compositions of this invention are highly resistant to heat and flames. A four-inch thick specimen of material was tested by applying a direct flame, hot enough to cut steel, to one side of the specimen for 5 minutes. The test showed that the material was cool to the touch on the opposite side of the specimen. Additionally the material has a thermal conductivity of approximately 50% that of conventional concrete. These properties make this material especially well suited for firewalls, building components, and other applications where a high degree of fire resistance and heat insulation are required.

Figure 2:
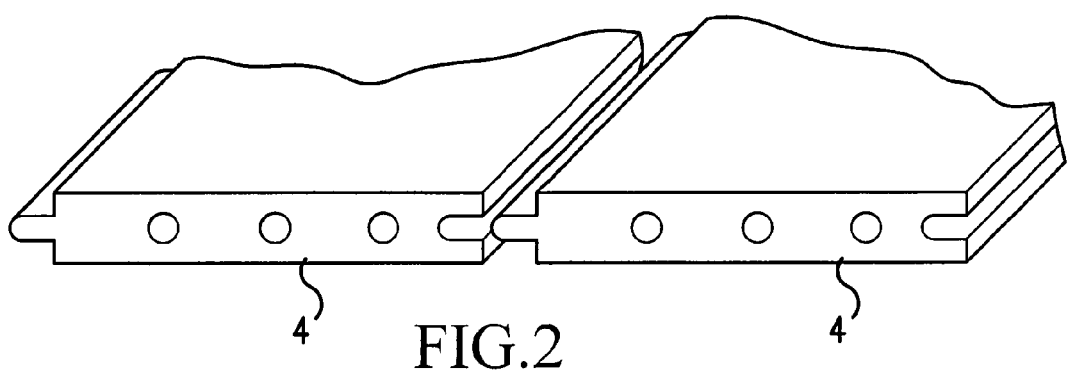
FIG. 2 illustrates roof planks used in the assembly of FIG. 1.

FIG. 1 illustrates a steel reinforced structure using components made from the above described improved cementitious material or similar cementitious materials. High ductile steel reinforcing rods 5 are used in this construction method since the cementitious material of this composition is also relatively ductile. FIG. 1 shows footer 1 forming a portion of the foundation of a structure using this assembly and reinforcing method. One or more columns 2 are placed upon or formed on top of the footer forming a vertical component. Next, one or more bearing beams 3 are placed or formed horizontally on top of the column or columns. Roof planks 4 are laid edge to edge on top of the bearing beam or beams and steel-reinforcing rods 5 are used to reinforce the structure. Rod or rods 5 are anchored in the footer using a grapnel 6 or other type of anchoring fastener fixed to the bottom end of the reinforcing rod 5 and embedded or otherwise fixed within the footer 1. The reinforcing rod 5 runs through the column 2, the bearing beam 3, and the roof plank 4. A steel washer or plate 7 is fixed to the top of the steel reinforcing rod 5 by welding or other fastening means to fix the components in place. FIG. 2 illustrates roof planks 4 that are assembled edge-to-edge using a tongue and groove connection. By assembling or forming these components in the manner described the steel rods act to reinforce and fix the components together. The resulting structure is very strong and resistant to stresses caused by tornados, hurricanes, floods and other weather conditions. This reinforcing technique creates a structure that is efficient and economical to produce. While the illustrated reinforcing technique shows an example of how typical building components are reinforced, other known components may be reinforced using the same technique.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A cementitious composition comprising:
    a. ribbon-like virgin polyethylene strips,
    b. cement,
    c. water, and
    d. aggregate,
    wherein the cementitious composition comprises about 13 parts by weight of ribbon-like virgin polyethylene strips, about 27.5-30 parts by weight of cement, about 100-113.3 parts by weight of water, and about 163-280 parts by weight of aggregate.

2. The cementitious composition of claim 1 wherein the aggregate includes whole shredded recycled tires.

3. The cementitious composition of claim 1 wherein the aggregate includes recycled coal combustion products.

4. The cementitious composition of claim 1 wherein the aggregate includes recycled waste wood products.

5. The cementitious composition of claim 1 wherein the aggregate includes recycled waste gypsum products.

6. The cementitious composition of claim 1 wherein residuals of titanium dioxides are included in the composition as an additive.

7. The cementitious composition of claim 1 wherein the aggregate includes whole shredded recycled tires.

8. The cementitious composition of claim 1 wherein the aggregate includes recycled waste coal combustion by-products.

9. The cementitious composition of claim 1 wherein the aggregate includes recycled waste wood products.

10. The cementitious composition of claim 1 wherein the aggregate includes recycled waste gypsum products.

11. The cementitious composition of claim 1 wherein residuals of titanium dioxides are included in the composition as an additive.

12. A structural component made from a cementitious composition comprising:
    a. ribbon-like virgin polyethylene strips,
    b. cement,
    c. water, and
    d. aggregate,
    wherein the cementitious composition comprises about 13 parts by weight of ribbon-like virgin polyethylene strips, about 27.5-30 parts by weight of cement, about 100-113.3 parts by weight of water, and about 163-280 parts by weight of aggregate.

13. The cementitious composition of claim 1 wherein the length of the ribbon-like virgin polyethylene strips is 5 to 40 times the width and the thickness of the strip is from less than 1 mil to several mils thick.

14. The cementitious composition of claim 1 wherein the length of the ribbon-like virgin polyethylene strips is 5 to 40 times the width and the thickness of the strip is from less than 1 mil to several mils thick.

* * * * *